Figure 1:
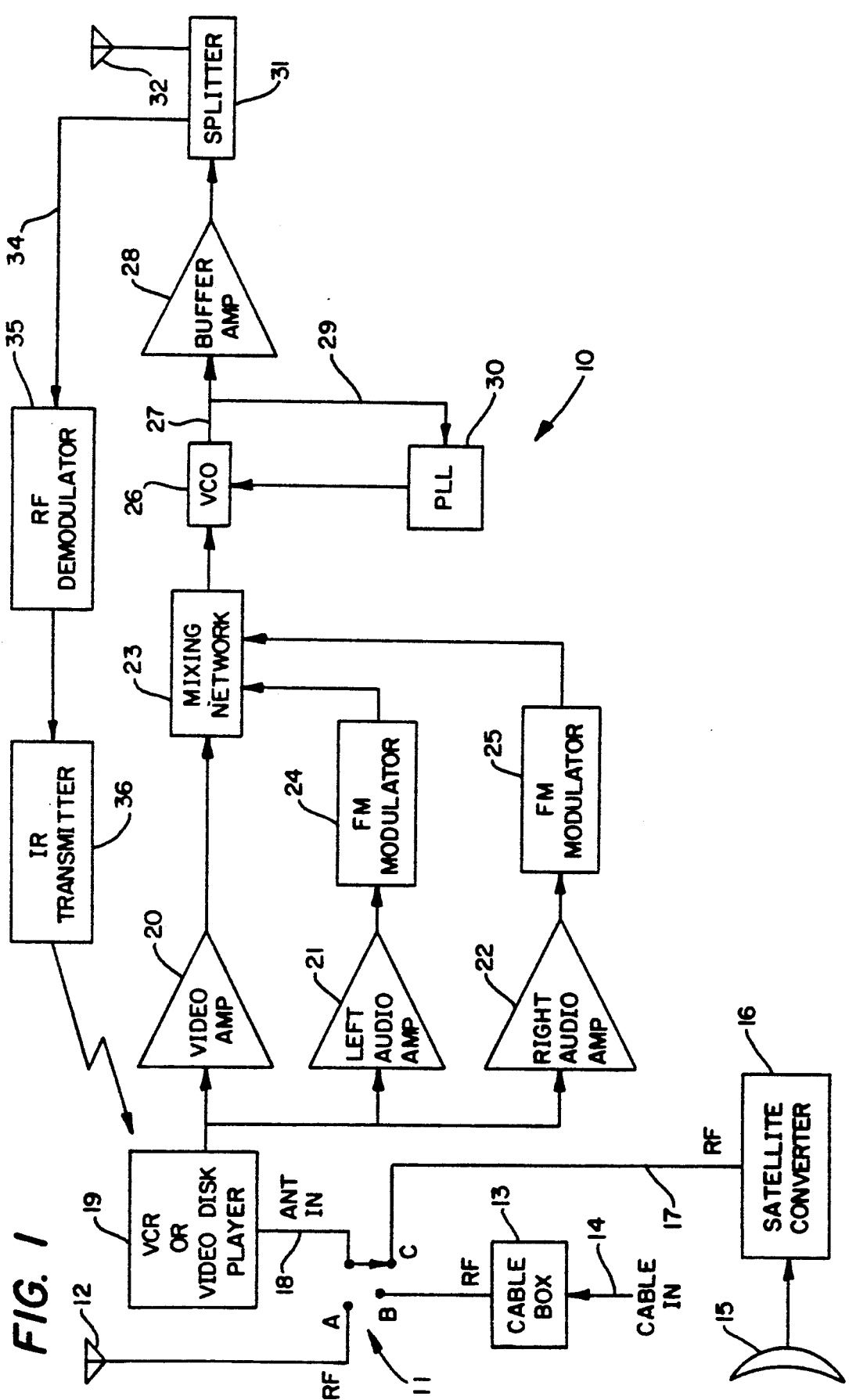

United States Patent [19]

Vance

[11] Patent Number: 5,243,415
[45] Date of Patent: Sep. 7, 1993

[54] LIMITED RANGE STEREO-AUDIO VIDEO RF TRANSMITTER TO MULTIPLE RECEIVER SYSTEM

[75] Inventor: R. Edward Vance, Carrollton, Tex.

[73] Assignee: Primo Microphoes, Inc., Mckinney, Tex.

[21] Appl. No.: 680,840

[22] Filed: Apr. 5, 1991

[51] Int. Cl.⁵ .......................... H04B 7/00; H04N 1/00
[52] U.S. Cl. ..................................... 358/86; 358/144; 358/144.1; 455/4.1; 455/6.1
[58] Field of Search ............... 455/4.1, 4.2, 6.1, 6.3, 455/45, 66, 69, 352, 353; 358/86, 144, 198, 194.1; 381/3, 4, 14, 79

[56] References Cited

U.S. PATENT DOCUMENTS

| | | | |
|---|---|---|---|
| 4,779,129 | 10/1988 | Uee et al. | 455/4.2 |
| 4,885,803 | 12/1989 | Hermann et al. | 455/4.1 |
| 5,101,499 | 3/1992 | Streck et al. | 455/4.1 |

Primary Examiner—Reinhard J. Eisenzopf
Assistant Examiner—Christine K. Belzer
Attorney, Agent, or Firm—Warren H. Kintzinger

[57] ABSTRACT

A stereo-audio video limited range low power RF transmitter to receiver system is provided transmitting signal from a video cassette recorder (VCR), satellite converter, TV camera, cable select box and a TV receiver/monitor, or VCR, utilizing a wireless signal path retaining signal quality normally associated with conventional wiring. Two-channel stereo-audio is passed via two independent audio channels matched to selected video channels for combined short range RF transmitter to receiver transmission to one or more television sets and/or VCR sets in different rooms, with at times display and/or recording simultaneously the same transmitted program from the transmitter of the system.

19 Claims, 2 Drawing Sheets

LIMITED RANGE STEREO-AUDIO VIDEO RF TRANSMITTER TO MULTIPLE RECEIVER SYSTEM

This invention relates in general to limited range stereo-audio video television program transmission, and more particularly, to a stereo-audio video limited range low power wireless television program transmitter to receiver system.

Television has constantly been improving through the years with many households having a number of sets located in various rooms. There are also office buildings, motels and hotels, retirement homes and hospitals where many sets are spread through many rooms. With advances in devices and systems producing television signals driving TV sets there have not been trouble free methods of connecting the TV devices and systems to the TV sets spread out in other rooms. Interconnecting technology simply has not kept pace. There are VCR's and many times two or more TV sets in a house with an A-B switch, cable select box and signal splitters interconnected by wire (including twisted pair lines) with interference pick up and numerous wire connections subject to separation. Coaxial cable has been used for wire connections in an effort to avoid interference pickup but it is cumbersome and expensive to install running from room to room and poses matching problems when additional components requiring additional wiring connections are added to a system. Transmission of TV signals over power lines has also been tried but this approach has problems of its own including signal feed out back to incoming power lines even through intervening power supply transformers.

It is therefore a principal object of this invention to provide a new limited range stereo-audio video wireless RF transmitter to receiver system providing improved performance over pre-existing systems.

Another object with such a wireless TV transmission system is to provide more versatile TV set placement without transmission wire interconnect problems that would otherwise be imposed.

A further object is to provide such a wireless TV transmission system achieving significant improvement over other systems for short-range video transmission by using video direct frequency modulation with a high deviation ratio as large as consistent with FCC regulations.

Still another object is to provide such a wireless TV transmission system utilizing multi-stage demodulation with sufficient bandwidth to allow recovery of all sidebands of interest, including the audio sub-carriers and with two separate FM tracking demodulators with sub-carrier demodulation allowing full audio bandwidth and excellent separation.

Features of the invention useful in accomplishing the above objects include, in a limited range stereo-audio video wireless RF transmitter to multiple receiver system, a stereo-audio video limited range low power RF transmitter to receiver system is provided transmitting signal from a video cassette recorder (VCR), satellite converter, TV camera, cable select box and a TV receiver/monitor, or VDP, utilizing a wireless signal path retaining signal quality normally associated with conventional wiring. Two-channel stereo-audio is passed via two independent audio channels matched to selected video channels for combined short range RF transmitter to receiver transmission to one or more television sets and/or VCR sets in different rooms, with at times display and/or recording simultaneously the same transmitted program from the transmitter of the system. The system transports stereo-audio utilizing two independent sub-carriers as opposed to any multiplexing form. Phase lock loop circuitry is used in the transmitter in place of a direct controlled crystal oscillator. High deviation ratio frequency modulation is employed and the transmitter does not employ RF demodulation in video transmission. Further, a full wave length delta antenna is employed with the transmitter in place of a flat plane antenna at one-quarter wave length. In addition a loop type receiving antenna is used to help supress noise from some noise interference generating sources.

A specific embodiment representing what is presently regarded as the best mode of carrying out the invention is illustrated in the accompanying drawings.

Figure 2:
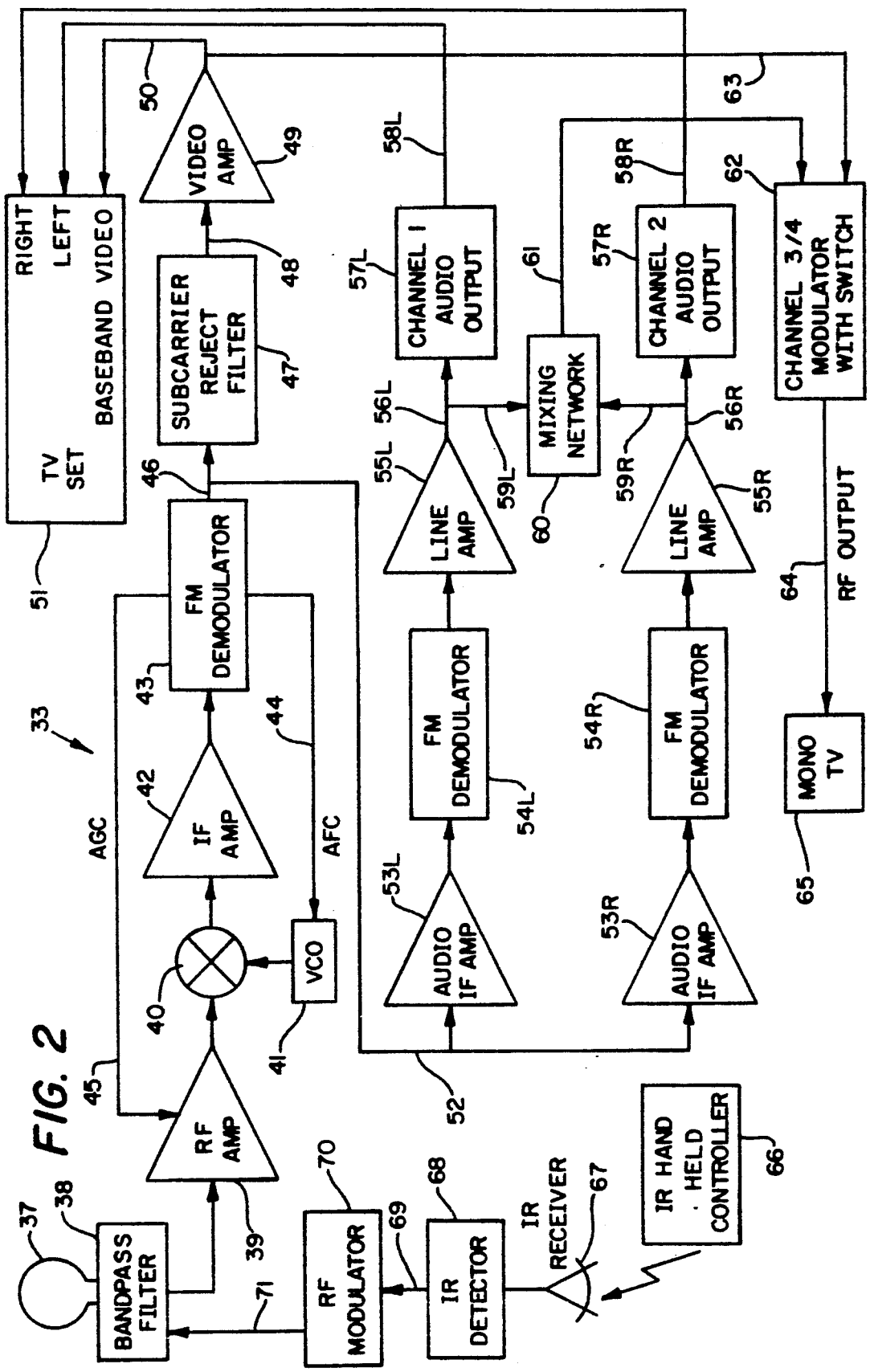

In the drawings:

FIG. 1 represents a block schematic view of a two channel stereo-audio video wireless RF transmitter for transmission to one or more TV sets; and, FIG. 2, a stereo TV wireless receiver system for receiving wireless TV transmission from a wireless RF transmitter.

Referring to the drawings:

The limited range local transmitter 10 of FIG. 1 is shown to be a television video and stereo audio programming wireless RF transmitter for wireless program transmission to one or more TV sets. The input connection via ABC switch 11 from an RF receiving antenna 12 to switch Contact "A", RF from cable box 13 (receiving programming through cable 14) to switch contact "B" and satellite 15 input via satellite converter 16 through RF line 17 to switch contact "C". The ABC switch RF signal line 18 is connected for feeding RF signal programming to VCR and/or video disk player 19. The video signal output of the VCR or VDP player 19 is applied as an input to video amplifier 20, the left audio output of player 19 is applied as an input to left audio amplifier 21 and right audio output of player 19 as an input to right audio amplifier 22. The output of video amplifier 20 is applied as an input to mixing network 23, the output of left audio amplifier 21 is applied through FM modulator 24 as an input to the mixing network 23 and the output of right audio amplifier 22 is applied through FM modulator 25 also as an input to mixing network 23. The output of the mixing network 23 is applied as an input to voltage controlled oscillator (VCO) 26 that has an output line 27 connected as an input to buffer amplifier 28 and also via a feed back loop line 29 to and through phased locked loop circuit 30 to VCO 26. The output of buffer amplifier 28 is applied as an output RF signal input to RF signal splitter circuit 31 and therethrough to antenna 32 for RF wireless transmission to one or more receivers like receiver 33 of FIG. 2 that periodically transmits wireless control RF signalling back to antenna 32. This back RF signalling is passed through RF signal splitter circuit 31 and line 34 to RF demodulator 35 with its output connected as an input to infrared (IR) transmitter 36 for IR control signal transmission therefrom to an IR control signal input receiver in normally remote controlled VCR or video disk player (VDP) 19 for programming selection control of the VCR or VDP itself or in the instance of utilizing the VCR as a means of signal selection therethrough from RF antenna 12, cable 14 or satellite RF line 17 dependent on the setting of ABC switch 11. This IR transmitter can also be used to transmit control signals to cable boxes and satellite converters so equipped.

RF wireless receiver 33 is shown to have a directional loop antenna 37 as its wireless signal input element feeding received RF signalling to passive bandpass filter 38 that includes a RF signal splitter circuit. The RF signal output from filter 38 is connected as an input to RF signal amplifier 39 having an output connection to signal mixer 40 that combines the RF signal from amplifier 39 with the signal input from voltage controlled oscillator (VCO) 41. The output of signal mixer 40 is connected as an input to and through RF amplifier 42 to FM demodulator circuit 43 that has an AFC (automatic frequency control) signal connection 44 to VCO 41 and an AGC (automatic gain control) connection 45 back to RF signal amplifier 39. The output line connection 46 from FM demodulator circuit 43 is connected as an input to subcarrier reject filter circuit 47 output line 46 connected as the input to video amplifier 49 that has an output line 50 connection as the baseband video input connection to TV set 51. A branch line connection 52 from line connection 46 is connected as the input to left audio IF amplifier 53L and as the input to right audio IF amplifier 53R. The output of left IF amplifier 53L is connected as an input to FM demodulator 54L output connected as an input to line amplifier 55L with an output line 56L connection to channel audio output circuit 57L. The output line 58L of circuit 57L is connected as the left audio input to stereo TV set 51. In like manner the branch line connection 52 also connected as the input to right audio IF amplifier 53R with the output thereof connected as an input to FM demodulator 54R. The output of FM demodulator 54R is connected as an input to line amplifier 55R with output line 56R connected to channel audio output circuit 57R. The output line 58R of circuit 57R is connected as the right audio input to stereo TV set 51.

A branch 59L of line 56L out of line amplifier 55L and branch 59R of line 56R out of line amplifier 55R are connected as inputs to mixing network circuit 60 developing a combined audio fed through line 61 to channel ¾ modulator circuit with switch 62. Branch line 63 from video amplifier output line 50 is also connected as an input to channel ¾ modulator circuit 62 that feeds RF output programming through line 64 to mono TV set 65.

An infrared (IR) hand held controller 66 is used by a TV viewer for generating infrared control signals transmitted to IR receiver 67 input connected to IR detector 68. The output line 69 connection of IR detector 68 is the input connection to RF modulator circuit 70 having an output line 71 connection to bandpass filter and splitter circuit 38. This RF control signalling is passed to loop antenna 37 and transmitted back to antenna 32 and passed back through RF signal splitter circuit 31 and line 34 to RF demodulator 35. The demodulator 35 output is an input to infrared (IR) transmitter 36 for IR control signal transmission therefrom to an IR control signal input receiver in normally remote controlled VCR or video disk player (VDP) 19 for programming selection control of the VCR or VDP itself or in the instance of utilizing the VCR as a means of signal selection therethrough from RF antenna 12, cable 14 or satellite RF line 17 dependent on the setting of ABC switch 11. This IR transmitter can also be used to transmit control signals to cable boxes and satellite converters when so equipped.

This stereo-audio video limited range low power wireless television program transmitter to receiver system effectively replaces the wired signal paths between a video cassette recorder satellite converter, TV camera, cable select box and a TV receiver/monitor or VDP. This is accomplished utilizing a wireless signal path, while retaining the signal quality normally associated with the conventionally wired system. Where available two-channel stereo-audio is provided through two independent audio channels along with providing for multiple television, and/or VCR sets in different rooms to display/record simultaneously the same program material via the same system.

The system consists of a transmitter and a separate receiver or receivers. The transmitter features inputs for a standard composite video signal and two audio signals. These inputs are compatible with the video and audio outputs typically found on consumer VCR's and satellite converters. The receivers provide audio and composite video outputs suitable for connection to a television set, or a VCR equipped with separate audio and video inputs. The audio outputs also allow connection to the inputs of a stereo sound system. In addition to the discrete audio and video outputs, the receivers provide a modulated RF output on television channel 3 or 4, at the option of the user. This allows the system connection to a television set having no separate inputs for audio and video. The transmitter and receiver feature horizontally polarized antennas to decrease the system susceptibility to a vertically polarized noise and the receiving antenna is a loop type to further assist in supressing noise from certain interference sources. It is an RF wireless transmission system where the transmitter output, while in the radio frequency, is of a frequency and power level consistent with the requirements of the Federal Communications Commission for license free service under provisions of Part 15 of the Rules. This system achieves a significant improvement over systems for short-range video transmission by using video direct frequency modulation with a high deviation ratio as large as consistent with the FCC regulations (2:1 minimum). The device provides two separate audio channels through FM baseband modulation with two audio sub-carriers. This system is applicable to all Part 15 frequency bands above 900 MHz.

In the RF wireless transmission system the receiver(s) utilize multi-stage demodulation techniques with sufficient bandwidth to allow recovery of all sidebands of interest, including the audio sub-carriers. Two separate FM tracking demodulators provide sub-carrier demodulation to allow for full audio bandwidth and excellent separation. In order to minimize the effects of co-channel interference from other emitters of radio frequency energy, the device features means for manually shifting the resting carrier frequency of the transmitter. Although the device utilizes a very high deviation ratio and thereby will intentionally occupy the majority of the bandwidth available, it has been shown that a relatively small shift in center frequency can result in avoiding the ill effects of co-channel interference. Therefore, ten percent (10%) of the available bandwidth is reserved for this purpose.

In the transmitter 10 the video limiting amplifier 20 levels its input signal for application to mixing network 23. Audio input signals are level controlled by ALC amplifiers 21 and 22 with the outputs used to modulate the FM sub-carriers in the FM audio modulators 24 and 25 with the outputs routed to the mixing network 23.

The video signal with the sub-carriers mixed thereto is used to frequency modulate voltage controlled oscillator 26 to produce a wideband RF signal with a deviation ratio of at least 2:1. The base frequency of the VCO 26 is held to the highest degree of stability by the phase lock loop (PLL) circuitry 30 virtually eliminating the drift problem otherwise found to be inherent in systems operating at these higher frequencies. In addition the PLL circuitry 30 eliminates intermediate frequencies otherwise generated in conventional crystal controlled transmitter claims. The resulting signal is amplified, by buffer amplifier 28 to provide the maximum field strength allowed by the applicable FCC part 15 reference output to antenna 32.

RF input to receiver 33 via directional loop antenna 37 is passed through passive bandpass filter and splitter circuit 38 that attenuates out-of-band signals to RF amplifier 39 that increases the level of the resulting signal by approximately ten db. The mixer 40 combines this RF signal with that from the local oscillator VCO 41 to form an intermediate frequency (IF) signal raised by IF amplifier 42 to approximately −20 dbm (below one milliwatt) level. Wideband FM demodulator 43 provides three principal outputs Video and Left and Right audio outputs in addition to producing an automatic gain control signal (out of detecting and amplifying the through signal strength) controlling the gain of the RF amplifier 39. Monitoring of the center frequency in FM demodulator 43 is used in producing an automatic frequency control signal forcing the VCO 41 to track slow received signal frequency variations and to compensate for thermal drift in the system. The other outputs from the FM demodulator 43, the demodulated baseband video passed to sub-carrier reject filter 47 that removes the high frequency components from the video that is level increased through video amplifier 49. The audio IF amplifiers 53L and 53R filter and amplify the audio sub-carrier. The FM demodulators 54L and 54R then recover the two audio signals and audio line amplifiers 55L and 55R boost the signals to appropriate output signal levels.

Whereas this invention has been described with respect to a single embodiment thereof, it should be realized that various changes may be made without departing from the essential contributions to the art made by the teachings hereof.

I claim:

1. A limited range stereo-audio video transmitter to receiver system comprising: transmitter means including, radio frequency combined TV video and two audio channel (left and right) signal source means; video signal amplifying means; left audio channel amplifying means; and right audio channel amplifying means connected to said signal source means; mixing network circuit means circuit connected to the outputs of said video, left and right audio amplifying means; voltage controlled oscillator (VCO) means with output line connection means; phase lock loop circuit means connected from said VCO output line connection means back to said VCO; said VCO output line connection means connected as an input to a second amplifier circuit; said second amplifier circuit output connected to transmitter antenna means; a RF receiver antenna; receiver means including, bandpass filter means input connected to receive RF program signalling from said RF receiver antenna; RF signal amplifier means connected to an output from said bandpass filter means; signal mixer circuit means connected to the outputs of said RF signal amplifier means and the output of a receiver VCO, and having an output connection as the input connection to an intermediate frequency (IF) amplifier output connected as the input to an FM demodulator; said FM demodulator having an AGC connection back to said RF signal amplifier means and an AFC connection back to said VCO; said FM demodulator also having an output connection through a subcarrier reject filter circuit as the baseband video signal input connection to a stereo TV set; said FM demodulator also having audio output connection to left channel audio IF amplifier means, in a left audio channel connected to the left audio channel input connection of said stereo TV set, and with said FM demodulator also having audio output connection to right channel audio IF amplifier means in a right audio channel connected to the right audio channel input connection of said stereo TV set.

2. The limited range stereo-audio video RF transmitter to receiver system of claim 1, wherein the system stereo audio utilizes two independent sub-carriers with said left channel audio IF amplifier connected through a left audio channel FM demodulator, line amplifier and left channel audio output circuit connection to the left audio channel input connection of said stereo TV set; and with said right channel audio IF amplifier connected through a right audio channel FM demodulator, line amplifier and right channel audio output circuit connection to the right audio channel input connection of said stereo TV set.

3. The limited range stereo-audio video RF transmitter to receiver system of claim 2, wherein a mixing network circuit is connected to receive the audio output signal of said left audio channel line amplifier, and to receive the audio output signal of said right audio channel line amplifier, and output connected to a channel ¾ modulator circuit with switch; connection of the video sub-carrier reject filter output video signal input to a stereo TV set and also to said channel ¾ modulator circuit with switch; an RF output combined mono TV signal output of said channel ¾ modulator circuit with switch connectable as the RF signal input to a mono TV set.

4. The limited range stereo-audio video RF transmitter to receiver system of claim 3, wherein said sub-carrier reject filter circuit output is connected through a video amplifier as part of said baseband video signal input connection to a stereo TV set; and with the connection of the video sub-carrier reject filter output video signal input to a stereo TV set also to said channel ¾ modulator circuit with switch being a connection from the output of said video amplifier.

5. The limited range stereo-audio video RF transmitter to receiver system of claim 1, wherein said sub-carrier reject filter circuit output is connected through a video amplifier as part of said baseband video signal input connection to a stereo TV set.

6. The limited range stereo-audio video RF transmitter to receiver system of claim 1, wherein said radio frequency combined TV video and two audio channel (left and right) signal source means is a TV cable RF signal source.

7. The limited range stereo-audio video RF transmitter to receiver system of claim 6, wherein said TV cable RF signal source includes a cable box circuit with an RF signal output connection as said radio frequency combined TV video and two audio channel (left and right) signal source.

8. The limited range stereo-audio video RF transmitter to receiver system of claim 7, wherein said cable box circuit RF signal output connection is through a VCR player.

9. The limited range stereo-audio video RF transmitter to receiver system of claim 7, wherein said cable box circuit RF signal output connection is through a VDP player.

10. The limited range stereo-audio video RF transmitter to receiver system of claim 1, wherein said radio frequency combied TV and two audio channel (left and right) signal source means is a satellite antenna dish connected through a satellite converter circuit with an RF signal connection to the transmitter the system.

11. The limited range stereo-audio video RF transmitter to receiver system of claim 1, wherein said radio frequency combined TV video and two audio channel (left and right) signal source means is a TV signal receiving antenna.

12. The limited range stereo-audio video RF transmitter to receiver system of claim 1, wherein said radio frequency combined TV video and two audio channel (left and right) signal source means includes a plurality of alternate RF signal sources; an ABC switch switchable for connecting a selected one of said plurality of alternate RF signal sources to said transmitter input.

13. The limited range stereo-audio video RF transmitter to receiver system of claim 1, wherein said transmitter antenna means is a full wave length delta antenna.

14. The limited range stereo-audio video RF transmitter to receiver system of claim 13, wherein said RF receiver antenna is a loop type antenna to assist in suppressing interference noise.

15. The limited range stereo-audio video RF transmitter to receiver system of claim 1, wherein splitter circuit means is included in said second amplifier circuit connection to said transmitter antenna means; said bandpass filter means also includes splitter circuit means; RF control signal source means connected to said splitter circuit means of said bandpass filter means for RF signalling to said RF receiver antenna in a transmit mode and said transmitter antenna means in a receive mode; RF signal control means in said RF transmitter connected to said splitter circuit means for receiving RF control signals received by said transmitter antenna means.

16. The limited range stereo-audio video RF transmitter to receiver system of claim 15, wherein said RF control signal source means includes an infrared controller generating infrared signals; an infrared receiver receiving infrared control signals; an infrared signal detector circuit; and an RF modulator circuit connected to said infrared signal detector and output connected to said splitter circuit means with said bandpass filter means.

17. The limited range stereo-audio video RF transmitter to receiver system of claim 16, wherein said RF signal control means in said RF transmitter includes connection of said transmitter antenna means back through said splitter circuit means; an RF demodulator circuit means input connected to said splitter circuit means and output connected to infrared transmitter circuit means for generating infrared control signals; infrared signal control means controlling play, audio and on/off functions of the system as controlled via infrared control signalling generated by said infrared transmitter circuit means.

18. The limited range stereo-audio video RF transmitter to receiver system of claim 17, wherein said infrared signal control means is part of the VCR with the infrared signal control means also having pause, change channel, search, fast forward and still frame/frame advance functions.

19. The limited range stereo-audio video RF transmitter to receiver system of claim 17, wherein said infrared signal control means is part of a Video Disk Player.

* * * * *